US011888936B2

(12) United States Patent
Antonas (10) Patent No.: US 11,888,936 B2
(45) Date of Patent: Jan. 30, 2024

(54) METHOD AND SYSTEM FOR AN OBJECT PROXY SERVICE

(71) Applicant: JPMorgan Chase Bank, N.A., New York, NY (US)

(72) Inventor: Zachariah Antonas, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/918,536

(22) Filed: Jul. 1, 2020

(65) Prior Publication Data

US 2022/0006862 A1 Jan. 6, 2022

(51) Int. Cl.
*G06F 15/16* (2006.01)
*H04L 67/1097* (2022.01)
*H04L 69/329* (2022.01)
*H04L 67/02* (2022.01)
*H04L 67/56* (2022.01)

(52) U.S. Cl.
CPC .......... *H04L 67/1097* (2013.01); *H04L 67/02* (2013.01); *H04L 67/56* (2022.05); *H04L 69/329* (2013.01)

(58) Field of Classification Search
CPC ..... H04L 67/1097; H04L 67/02; H04L 67/28; H04L 69/329

USPC .......................................................... 709/203
See application file for complete search history.

(56) References Cited

U.S. PATENT DOCUMENTS

| | | | |
|---|---|---|---|
| 10,769,118 B1* | 9/2020 | Abushwashi | G06F 16/86 |
| 11,080,395 B1* | 8/2021 | Edwards | G06F 11/327 |
| 2013/0204849 A1* | 8/2013 | Chacko | G06F 3/0604 |
| | | | 707/692 |
| 2013/0218840 A1* | 8/2013 | Smith | G06F 16/2474 |
| | | | 707/639 |
| 2017/0185437 A1* | 6/2017 | Thomas | G06F 9/5061 |

* cited by examiner

*Primary Examiner* — Suraj M Joshi
*Assistant Examiner* — Joel Mesa
(74) *Attorney, Agent, or Firm* — GREENBLUM & BERNSTEIN, P.L.C.

(57) ABSTRACT

A method for providing a proxy redirect to facilitate a storage and a retrieval of an object is disclosed. The method includes receiving a mapping of a user to a logical container that stores the object and to a storage provider that stores the logical container; receiving a key corresponding to the logical container and associated with the user; storing the mapping and the key in a database; generating, for the user, an application protocol that redirects to a pre-signed web address based on the stored mapping and the stored key; and transmitting, via a communication interface, the application protocol to the one user. The method further includes the user using the application protocol to directly access the storage provider and retrieve the object.

20 Claims, 6 Drawing Sheets

METHOD AND SYSTEM FOR AN OBJECT PROXY SERVICE

BACKGROUND

1. Field of the Disclosure

This technology generally relates to methods and systems for an object proxy service, and more particularly to methods and systems for providing a pre-signed proxy redirect to facilitate object storage in user buckets on a plurality of cloud storage providers.

2. Background Information

Many entities today implement an object-based storage architecture to manage vast volumes of business data as objects that includes the data itself, a variable amount of metadata, and a globally unique identifier. For increased flexibility and cost efficiency, these entities may support object storage on multiple cloud-based object storage providers via a networked enterprise environment. The networked enterprise environment deploys a virtual layer such as, for example, a proxy service to connect the various cloud storage providers and to act as an object pass through, which enables the swapping of cloud storage providers. Historically, such implementations of a proxy service have resulted in varying degrees of success with respect to performance cost and impact to the user.

One drawback of using conventional proxy service implementations is that in most instances, the user only interacts with their designated cloud storage provider through the proxy service. As a result, the proxy service must retrieve a requested object from the cloud storage provider and then transmit the requested object to the user. As a pass through, the proxy service must perform two upload/download operations for every one user request to retrieve an object from the cloud storage provider, and vice versa for user requests to store objects. Such an implementation incurs significant performance penalties for an enterprise network with numerous users and cloud storage providers.

Therefore, there is a need for an object proxy service solution which issues a pre-signed redirect to the user, such that the user may retrieve the object directly from the designated cloud storage provider using the pre-signed redirect without the object first passing through the proxy service.

SUMMARY

The present disclosure, through one or more of its various aspects, embodiments, and/or specific features or sub-components, provides, inter alia, various systems, servers, devices, methods, media, programs, and platforms for providing a pre-signed proxy redirect to facilitate object storage in user buckets on a plurality of cloud storage providers.

According to an aspect of the present disclosure, a method for providing a proxy redirect to facilitate a storage and a retrieval of an object is provided. The method may be implemented by at least one processor. The method may include receiving at least one mapping of a user to a logical container that stores the object and to a storage provider that stores the logical container; receiving at least one key corresponding to the logical container and associated with the user; storing the at least one mapping and the at least one key in a database; automatically generating, for the user, at least one application protocol that redirects to a pre-signed web address based on the stored at least one mapping and the stored at least one key; and automatically transmitting, via a communication interface, the at least one application protocol to the user.

In accordance with an exemplary embodiment, the method may further include receiving at least one new mapping for the user that includes a new storage provider and at least one new key; updating the database with the at least one new mapping and the at least one new key; automatically generating, for the user, at least one new application protocol that redirects to a new pre-signed web address based on the at least one new mapping and the at least one new key; and automatically transmitting, via the communication interface, the at least one new application protocol to the user.

In accordance with an exemplary embodiment, the pre-signed web address may be valid to access the logical container at the storage provider for a predetermined period of time, and the predetermined period of time may be based on at least one from among a business policy and a regulation.

In accordance with an exemplary embodiment, the business policy may include at least one from among a threshold price charged by the storage provider and a threshold level of security compliance of the storage provider.

In accordance with an exemplary embodiment, the at least one application protocol may be generated by a separate microservice in an enterprise network.

In accordance with an exemplary embodiment, the object may include data, corresponding metadata, and a unique enterprise network identifier.

In accordance with an exemplary embodiment, the user may include at least one from among a monolithic application and a microservice application in an enterprise network.

In accordance with an exemplary embodiment, the at least one application protocol may be generated by a module that is integrated into the user, the user including a user application.

In accordance with an exemplary embodiment, the storage provider may include a third-party entity operating remote storage systems over a network.

In accordance with an exemplary embodiment, the at least one application protocol may include a Hypertext Transfer Protocol (HTTP) and the pre-signed web address may include a Uniform Resource Locator (URL) that grants access to the object identified in the URL.

According to an aspect of the present disclosure, a computing device configured to implement an execution of a method for providing a proxy redirect to facilitate a storage and a retrieval of an object is disclosed. The computing device comprising a processor; a memory; and a communication interface coupled to each of the processor and the memory, wherein the processor may be configured to receive at least one mapping of a user to a logical container that stores the object and to a storage provider that stores the logical container; receive at least one key corresponding to the logical container and associated with the user; store the at least one mapping and the at least one key in a database; automatically generate, for the user, at least one application protocol that redirects to a pre-signed web address based on the stored at least one mapping and the stored at least one key; and automatically transmit, via a communication interface, the at least one application protocol to the user.

In accordance with an exemplary embodiment, the processor may be further configured to receive at least one new mapping for the user that includes a new storage provider and at least one new key; update the database with the at least one new mapping and the at least one new key; automatically generate, for the user, at least one new application protocol that redirects to a new pre-signed web address based on the at least one new mapping and the at least one new key; and automatically transmit, via the communication interface, the at least one new application protocol to the user.

In accordance with an exemplary embodiment, the pre-signed web address may be valid to access the logical container at the storage provider for a predetermined period of time, and the predetermined period of time may be based on at least one from among a business policy and a regulation.

In accordance with an exemplary embodiment, the business policy may include at least one from among a threshold price charged by the storage provider and a threshold level of security compliance of the storage provider.

In accordance with an exemplary embodiment, the processor may be further configured to cause a separate microservice in an enterprise network to generate the at least one application protocol.

In accordance with an exemplary embodiment, the object may include data, corresponding metadata, and a unique enterprise network identifier.

In accordance with an exemplary embodiment, the user may include at least one from among a monolithic application and a microservice application in an enterprise network.

In accordance with an exemplary embodiment, the processor may be further configured to cause a module that is integrated into the user to generate the at least one application protocol, the user including a user application.

In accordance with an exemplary embodiment, the storage provider may include a third-party entity operating remote storage systems over a network.

In accordance with an exemplary embodiment, the at least one application protocol may include a Hypertext Transfer Protocol (HTTP) and the pre-signed web address may include a Uniform Resource Locator (URL) that grants access to the object identified in the URL.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
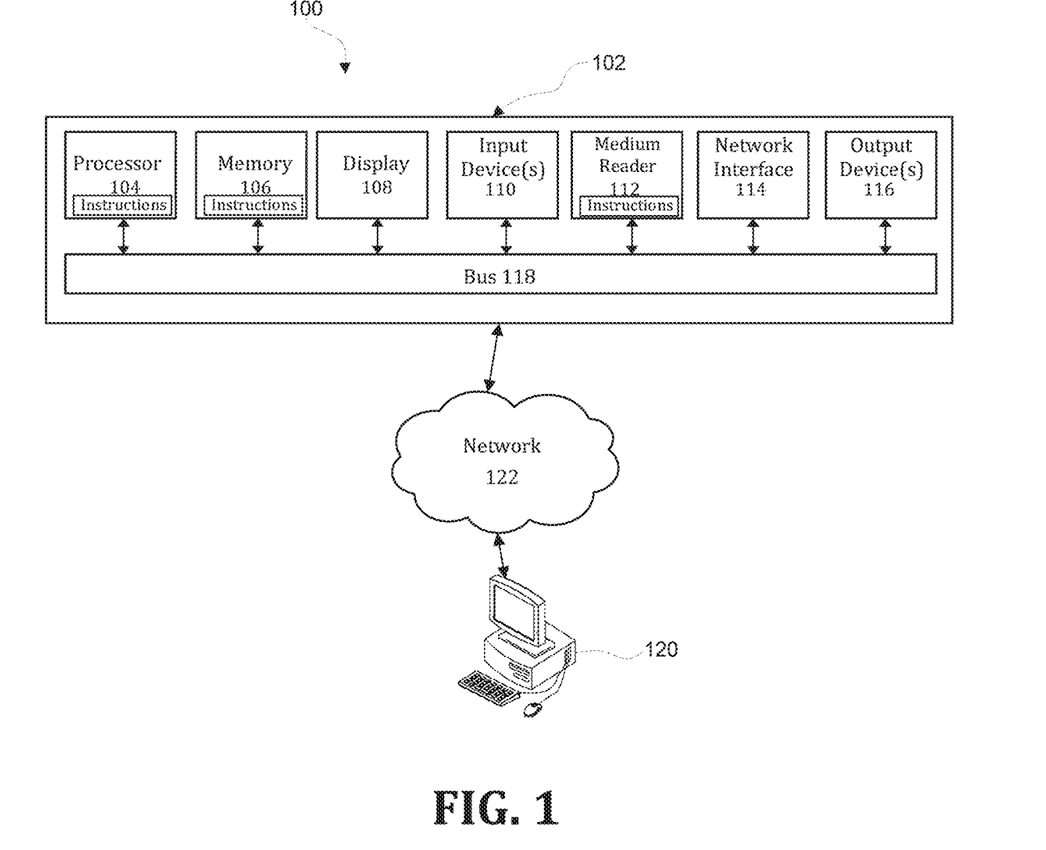
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a pre-signed proxy redirect to facilitate object storage in user buckets on a plurality of cloud storage providers.

Figure 2:
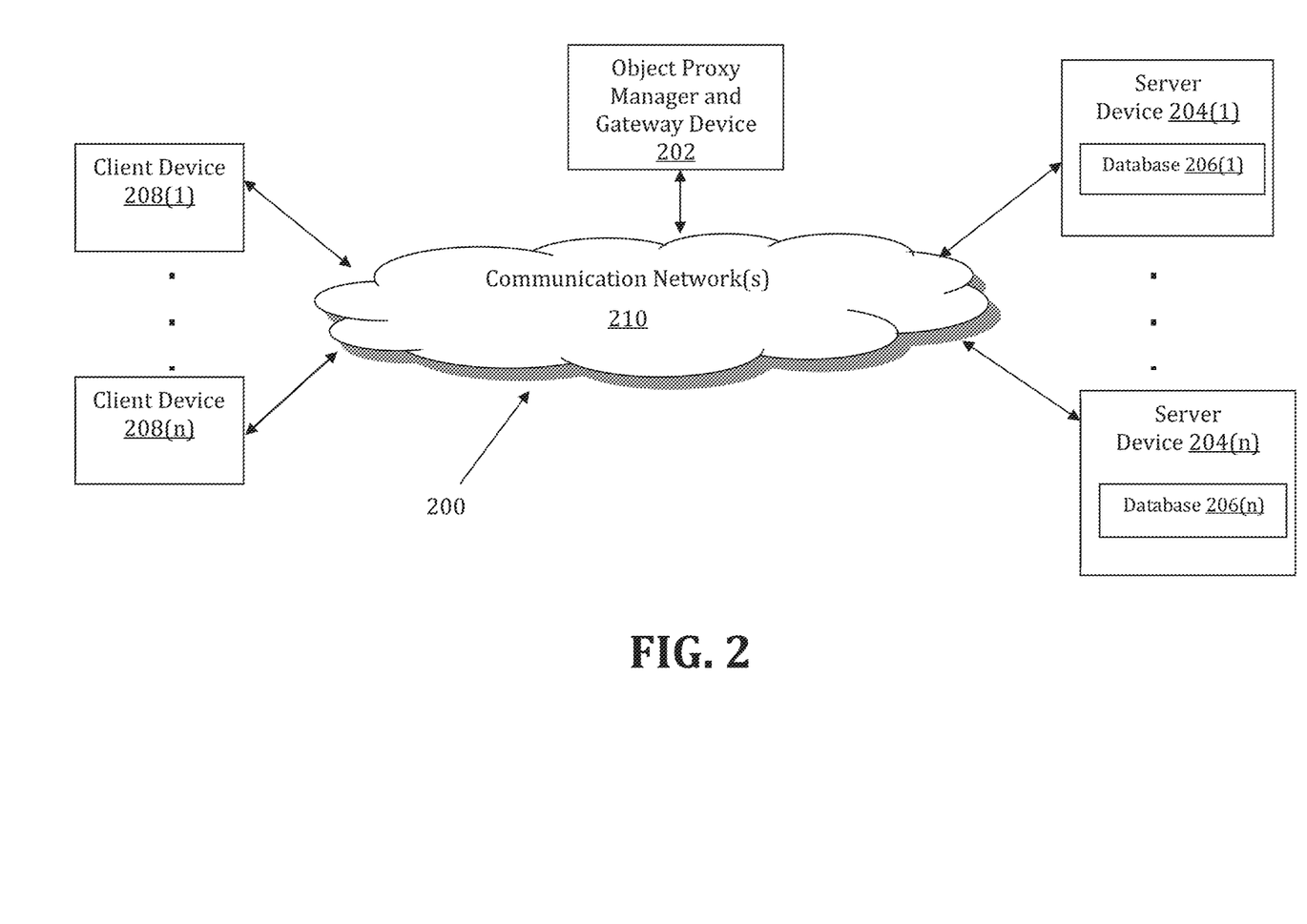
FIG. 2 illustrates an exemplary diagram of a network environment.

Referring to FIG. 2, a schematic of an exemplary network environment 200 for implementing a method for providing a pre-signed proxy redirect to facilitate object storage in user buckets on a plurality of cloud storage providers is illustrated. In an exemplary embodiment, the method is executable on any networked computer platform, such as, for example, a personal computer (PC).

The method for providing a pre-signed proxy redirect to facilitate object storage in user buckets on a plurality of cloud storage providers may be implemented by an Object Proxy Manager and Gateway (OPMG) device 202. The OPMG device 202 may be the same or similar to the computer system 102 as described with respect to FIG. 1. The OPMG device 202 may store one or more applications that can include executable instructions that, when executed by the OPMG device 202, cause the OPMG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OPMG device 202 itself, may be located in virtual server(s) running in a cloud-based computing environment rather than being tied to one or more specific physical network computing devices. Also, the application(s) may be running in one or more virtual machines (VMs) executing on the OPMG device 202. Additionally, in one or more embodiments of this technology, virtual machine(s) running on the OPMG device 202 may be managed or supervised by a hypervisor.

In the network environment 200 of FIG. 2, the OPMG device 202 is coupled to a plurality of server devices 204(1)-204(n) that hosts a plurality of databases 206(1)-206(n), and also to a plurality of client devices 208(1)-208(n) via communication network(s) 210. A communication interface of the OPMG device 202, such as the network interface 114 of the computer system 102 of FIG. 1, operatively couples and communicates between the OPMG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OPMG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and OPMG devices that efficiently implement a method for providing a pre-signed proxy redirect to facilitate object storage in user buckets on a plurality of cloud storage providers.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OPMG device 202 may be a standalone device or integrated with one or more other devices or apparatuses, such as one or more of the server devices 204(1)-204(n), for example. In one particular example, the OPMG device 202 may include or be hosted by one of the server devices 204(1)-204(n), and other arrangements are also possible. Moreover, one or more of the devices of the OPMG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OPMG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to objects, logical container locations, user to storage provider mapping information, and corresponding keys.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the OPMG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the OPMG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the OPMG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the OPMG device 202, the server devices 204(1)-204(n), or the client devices 208(1)-208(n), for example, may be configured to operate as virtual instances on the same physical machine. In other words, one or more of the OPMG device 202, the server devices 204(1)-204(n), or the client devices 208(1)-208(n) may operate on the same physical device rather than as separate devices communicating through communication network(s) 210. Additionally, there may be more or fewer OPMG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
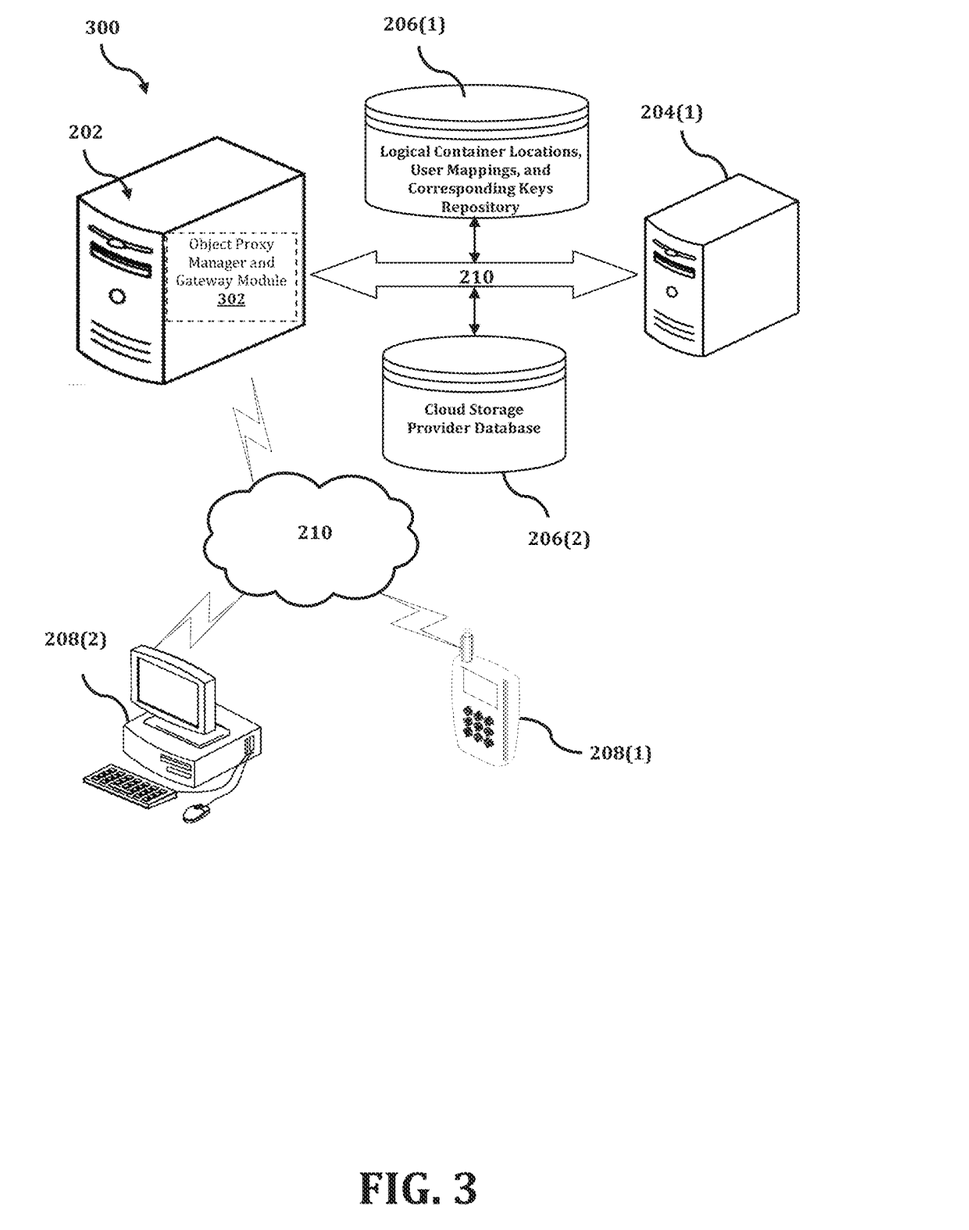
FIG. 3 shows an exemplary system for implementing a method for providing a pre-signed proxy redirect to facilitate object storage in user buckets on a plurality of cloud storage providers.

The OPMG device 202 is described and shown in FIG. 3 as including an object proxy manager and gateway module 302, although it may include other rules, policies, modules, databases, or applications, for example. As will be described below, the object proxy manager and gateway module 302 is configured to implement a method for providing a pre-signed proxy redirect to facilitate object storage in user buckets on a plurality of cloud storage providers.

An exemplary process 300 for implementing a mechanism for providing a pre-signed proxy redirect to facilitate object storage in user buckets on a plurality of cloud storage providers by utilizing the network environment of FIG. 2 is shown as being executed in FIG. 3. Specifically, a first client device 208(1) and a second client device 208(2) are illustrated as being in communication with OPMG device 202. In this regard, the first client device 208(1) and the second client device 208(2) may be "clients" of the OPMG device 202 and are described herein as such. Nevertheless, it is to be known and understood that the first client device 208(1) and/or the second client device 208(2) need not necessarily be "clients" of the OPMG device 202, or any entity described in association therewith herein. Any additional or alternative relationship may exist between either or both of the first client device 208(1) and the second client device 208(2) and the OPMG device 202, or no relationship may exist.

Further, OPMG device 202 is illustrated as being able to access a logical container locations, user mappings, and corresponding keys repository 206(1) and/or a cloud storage provider database 206(2). The object proxy manager and gateway module 302 may be configured to access these databases for implementing a method for providing a pre-signed proxy redirect to facilitate object storage in user buckets on a plurality of cloud storage providers.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the OPMG device 202 via broadband or cellular communication. Of course, these embodiments are merely exemplary and are not limiting or exhaustive.

Upon being started, the object proxy manager and gateway module 302 executes a process for providing a pre-signed proxy redirect to facilitate object storage in user buckets on a plurality of cloud storage providers. An exemplary process for providing a pre-signed proxy redirect to facilitate object storage in user buckets on a plurality of cloud storage providers is generally indicated at flowchart 400 in FIG. 4.

Figure 4:
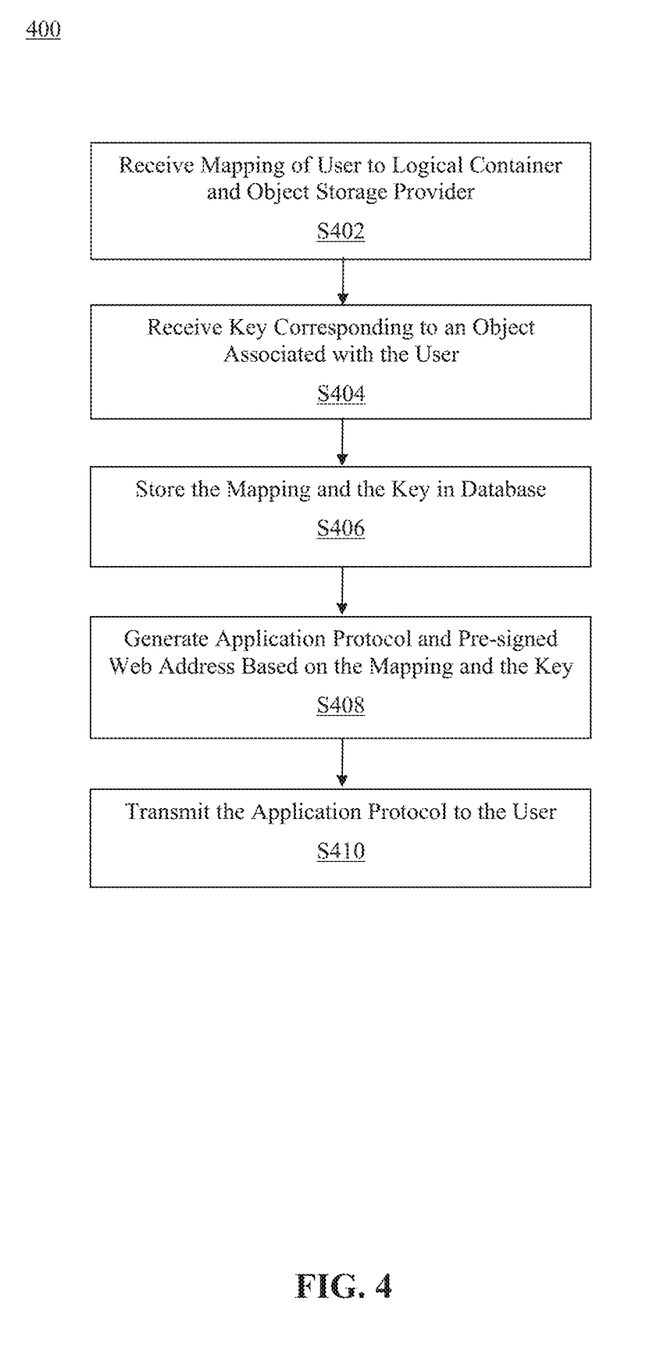
FIG. 4 is a flowchart of an exemplary process for implementing a method for providing a pre-signed proxy redirect to facilitate object storage in user buckets on a plurality of cloud storage providers.

In the process 400 of FIG. 4, at step S402, a mapping of a user to a logical container that stores an object and to a storage provider that stores the logical container may be received from an administrator. In an exemplary embodiment, the administrator may include a human administrator as well as an administrative module integrated in an application that manages mapping information. The administrative application may include network connected applications such as, for example, a microservice in an enterprise network.

In another exemplary embodiment, the object may include any type of data regardless of content type, corresponding metadata, and a unique enterprise network identifier. Storage of the object may include computer data storage architectures such as, for example, object storage and object-based storage that manages data as objects. In another exemplary embodiment, the object storage may be implemented at multiple levels such as, for example, a device level, a system level, and an interface level. Object storage may enable capabilities such as, for example, providing an interface that may be directly programmable by an application, providing a namespace that may span multiple instances of physical hardware, and providing data-management functions such as, for example, data replication and data distribution at object-level granularity. In another exemplary embodiment, storage of the object may refer to computer data storage architectures such as, for example, file systems which manages data as a file hierarchy and block storage which manages data as blocks within sectors and tracks.

In another exemplary embodiment, the object may be stored in a logical container. The logical container may be referenced as a bucket in an object-based storage architecture. In another exemplary embodiment, the bucket may be associated with a single compartment that has policies which determine what actions a user can perform on a bucket as well as what actions the user can perform on all of the objects in the bucket. The compartment may include a partitioning of the objects in the bucket and may be used to organize resources within that bucket. In another exemplary embodiment, the buckets may include a flat organization of containers on a single level within a namespace. The namespace may include a logical entity that serves as a top-level container for all buckets. The namespace may be scalable in size based on storage requirements without performance degradation relating to access of any particular bucket within the namespace.

In another exemplary embodiment, the user of the object-based storage architecture may include a monolithic application and a microservice application in an enterprise network. The monolithic application may describe a single-tiered software application where the user interface and data access code are combined into a single program from a single platform. The monolithic application may be self-contained and independent from other computing applications. In another exemplary embodiment, the microservice application may relate to a software development architecture such as, for example, a service-oriented architecture which arranges a complex application as a collection of coupled modular services. The modular services may include small, independently versioned, and scalable customer-focused services with specific business goals, which communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the storage provider may store the logical container in servers owned by the storage provider. The storage provider may include a third-party entity operating remote storage systems over a network. As will be appreciated by a person of ordinary skill in the art, the storage provider may include an entity such as, for example, Amazon Simple Storage Service, Google Cloud Storage, Azure Blob Storage, DigitalOcean Spaces, IBM Cloud Object Storage, and Oracle Cloud Infrastructure Object Storage that provides cloud storage as a service to enterprise networks.

In another exemplary embodiment, a user may be mapped to a logical container and to a storage provider. The mapping may be accomplished by using proprietary software as well as third-party software, which performs an operation to associate the user with the logical container and with the storage provider. The mapping software may include a graphical user interface for an administrator to manually provide necessary inputs as well as a connection interface for an application such as, for example, a microservice to automatically provide the necessary inputs. In another exemplary embodiment, the mapping may be accomplished on a control layer of an enterprise network.

At step S404, a key corresponding to the logical container and associated with a user may be received from an administrator. The key may also correspond to the object as well as the logical container. In an exemplary embodiment, the key may include the unique enterprise network identifier of the object. The key may be associated with the user that generated the object as well as with the user that may retrieve and manipulate the object. As will be appreciated by a person of ordinary skill in the art, the administrator may utilize any proprietary software as well as any third-party software to associate the key with the user. Similarly, the administrator may utilize any communication interface in the enterprise network to transmit the key.

At step S406, the mapping and the key may be stored in a database. The database may be organized using techniques such as, for example, a clustered database technique that includes a combination of more than one servers connected by a network interface. In an exemplary embodiment, the mapping information, the bucket locations, and the key may be stored in the database operated by the entity. As will be appreciated by a person of ordinary skill in the art, the database may utilize any storage schema such as, for example, local storage, networked storage, and cloud storage to store the mapping and the key.

At step S408, an application protocol that redirects to a pre-signed web address may be automatically generated based on the stored mapping and the stored key. In an exemplary embodiment, the application protocol may include an application-layer protocol such as, for example, a Hypertext Transfer Protocol (HTTP) for transmitting hypermedia documents such as, for example, a Hypertext Markup Language (HTML). The application protocol may define how messages are formatted and transmitted as well as what actions web servers and browsers may take in response to various commands. In another exemplary embodiment, the application protocol may be generated by a separate microservice in an enterprise network. The application protocol may be generated by an object proxy gateway in a data plane of the object proxy service. The object proxy gateway may retrieve storage provider endpoint information and user keys to generate and transmit the application protocol to the user. In another exemplary embodiment, the application protocol may be generated by a module that is integrated into the user application. The application protocol may be generated by an object proxy gateway module within the user application. The object proxy gateway module may include a component of the user application that may retrieve storage provider endpoint information and user keys to generate the application protocol as well as utilize the application protocol to obtain objects directly from a storage provider based on user application instructions.

In another exemplary embodiment, the pre-signed web address may include a web resource that specifies its location on a computer network such as, for example, a Uniform Resource Locator (URL) that grants access to the object identified in the URL. The URL may incorporate a domain name together with other network information to create a complete web address to direct a browser to a specific location on a network. In another exemplary embodiment, the pre-signed URL may grant access to a logical container via the web address and may be valid to access the logical container at the storage provider for a predetermined period of time. The predetermined period of time may be based on a fixed schedule such as, for example, a day, a week, and a month. In another exemplary embodiment, the predetermined period of time may also be based on at least one from among a business policy and a regulation. The business policy may include a threshold price charged by the storage provider and a threshold level of security compliance of the storage provider. For example, the business policy may dictate that a new storage provider may be needed when a monthly storage price passes the threshold price. The regulation may include governmental requirements and guidelines imposed on the entity utilizing the storage provider. For example, a government regulation may limit the type and quantity of information a financial institution may store on a cloud storage provider.

As will be appreciated by a person of ordinary skill in the art, the pre-signed URL may be generated based on any proprietary and third-party frameworks designed to generate URLs. The generated URL may utilize any application-layer protocol scheme such as, for example, HTTP and Hypertext Transfer Protocol Secure (HTTPS).

At step S410, the generated application protocol may be automatically transmitted to the user via a communication interface. By decoupling the storage provider from the user, storage providers may be swapped without disrupting user applications. As will be appreciated by a person of ordinary skill in the art, the communication interface may include an electronic circuit designed to a specific standard that enables one machine to telecommunicate with another machine, or one microservice to another microservice in an enterprise network.

In another exemplary embodiment, a new mapping for the user that may include a new storage provider and a new key may be received. The database may be automatically updated with the new mapping and the new key. A new application protocol that redirects to a new pre-signed web address may be automatically generated based on the new mapping and the new key. Then, the new application protocol may be automatically transmitted via the communication interface to the user.

In another exemplary embodiment, an object proxy service may include an object proxy manager and an object proxy gateway. The object proxy manager may provide administrators with an interface to map users to designated buckets on storage providers. The object proxy gateway may generate a HTTP redirect and pre-signed URL based on the relevant bucket locations, corresponding user keys, and user to storage provider mapping information in a clustered database in response to user input. In another exemplary embodiment, the object proxy service may enable object level encryption to further secure the object. The object proxy service may automatically implement rule driven lifecycles for buckets based on criteria such as, for example, a price charged by storage providers to lower costs and a change in user requirements for increased flexibility, for increased billing accuracy, and for improved storage efficiency.

Figure 5:
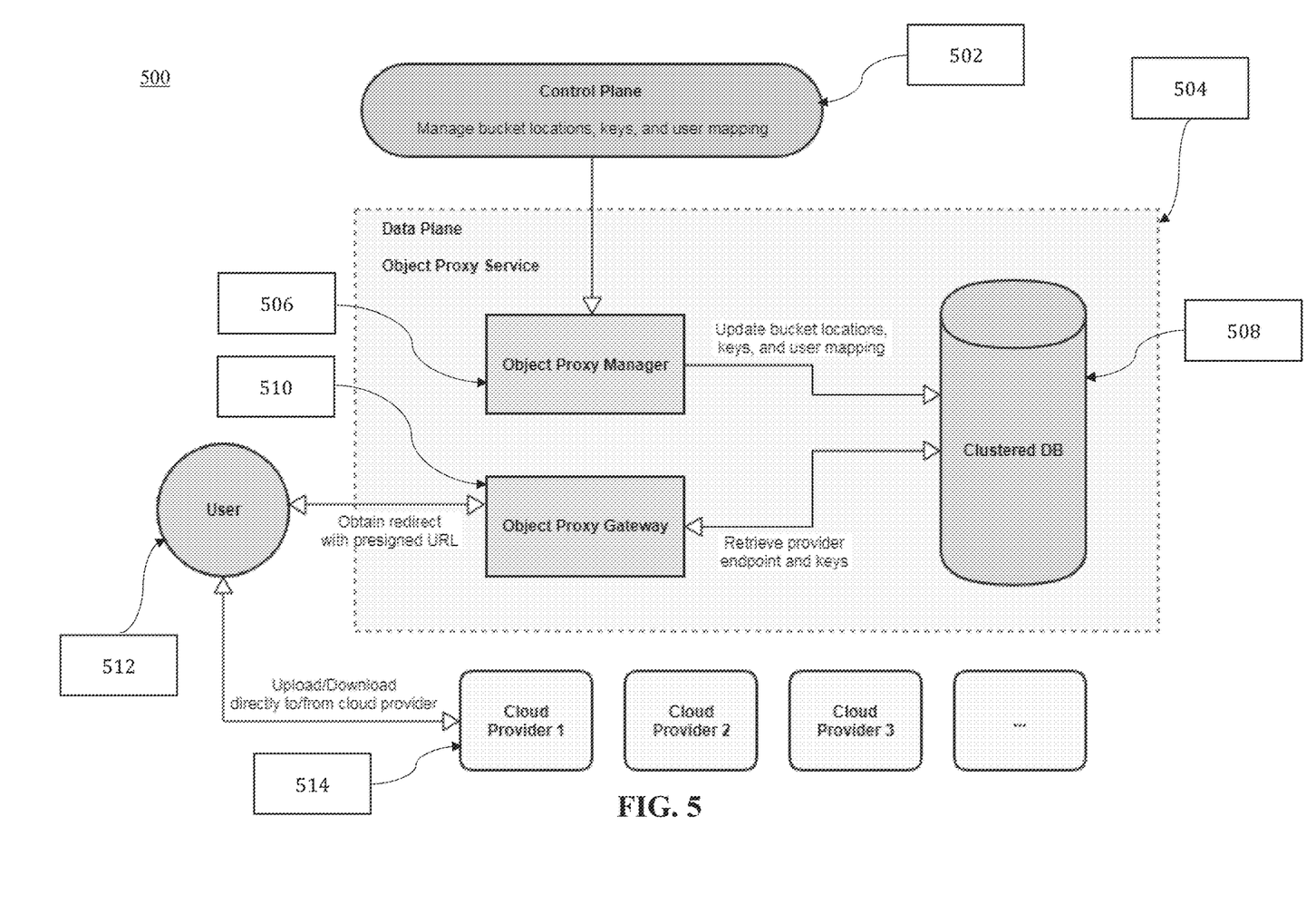
FIG. 5 is a diagram that illustrates a microservice that is usable for implementing a method for providing a pre-signed proxy redirect to facilitate object storage in user buckets on a plurality of cloud storage providers, according to an exemplary embodiment.

FIG. 5 is a diagram that illustrates a microservice that is usable for implementing a method for providing a pre-signed proxy redirect to facilitate object storage in user buckets on a plurality of cloud storage providers, according to an exemplary embodiment. FIG. 5 shows an implementation of the object proxy gateway as a separate microservice in an enterprise network.

As illustrated in FIG. 5, a control plane 502 manages bucket locations, corresponding user keys, and user to storage provider mapping information. Control plane 502 may operate on a different plane as data plane 504 where the object proxy service operates. Control plane 502 may provide bucket locations, corresponding user keys, and user to storage provider mapping information to an object proxy manager 506 in data plane 504. Object proxy manager 506 may include a microservice that provides administrators an interface to map users to a designated bucket at a storage provider. Object proxy manager 506 may store and update the bucket locations, corresponding user keys, and user to storage provider mapping information in a clustered database 508 in data plane 504. Relevant bucket locations, corresponding user keys, and user to storage provider mapping information from clustered database 508 may be retrieved by an object proxy gateway 510 in data plane 504. Object proxy gateway 510 may receive a request from user 512 to manipulate a stored object associated with user 512. In response to the request, object proxy gateway 510 may generate a HTTP redirect and pre-signed URL based on the relevant bucket locations, corresponding user keys, and user to storage provider mapping information in clustered database 508. Object proxy gateway 510 may then transmit the generated HTTP redirect and pre-signed URL to user 512. User 512 may utilize the generated HTTP redirect and pre-signed URL to directly upload objects to and download objects from a cloud provider 514.

By directly downloading and uploading objects from cloud provider 514, enterprise network performance may be enhanced due to a decrease in network consumption. Likewise, utilizing a HTTP redirect and pre-signed URL may result in faster response times for the user and may streamline application programming interface (API) experience across different cloud providers by minimizing the required access keys and secret keys.

Figure 6:
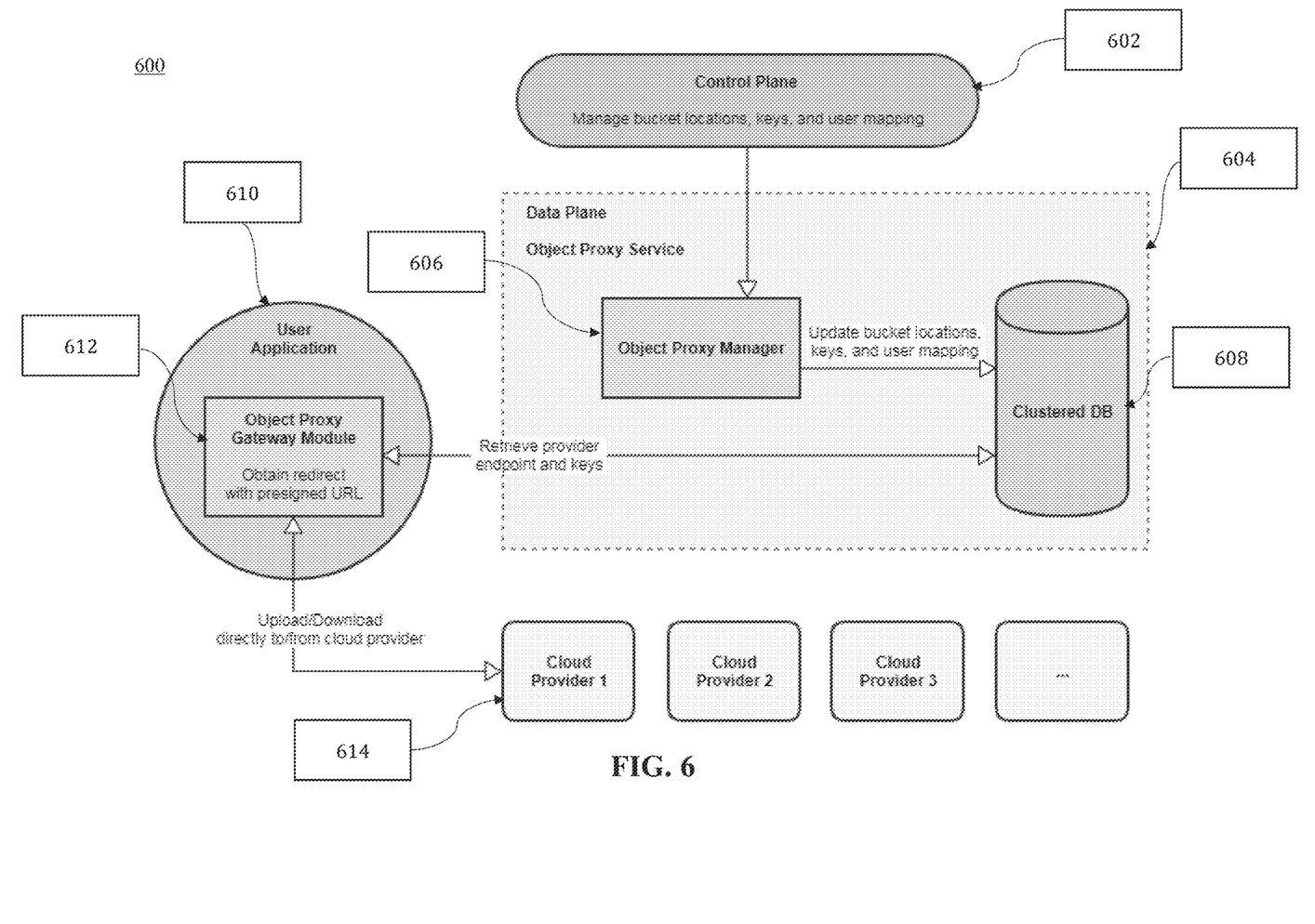
FIG. 6 is a diagram that illustrates a module on the user's application that is usable for implementing a method for providing a pre-signed proxy redirect to facilitate object storage in user buckets on a plurality of cloud storage providers, according to an exemplary embodiment.

FIG. 6 is a diagram that illustrates a module on the user's application that is usable for implementing a method for providing a pre-signed proxy redirect to facilitate object storage in user buckets on a plurality of cloud storage providers, according to an exemplary embodiment. FIG. 6 shows an implementation of the object proxy gateway as a lightweight module in the user application.

As illustrated in FIG. 6, a control plane 602 manages bucket locations, corresponding user keys, and user to storage provider mapping information. Control plane 602 may operate on a different plane as data plane 604 where the object proxy service operates. Control plane 602 may provide bucket locations, corresponding user keys, and user to storage provider mapping information to an object proxy manager 606 in data plane 604. Object proxy manager 606 may include a microservice that provides administrators an interface to map users to a designated bucket at a storage provider. Object proxy manager 606 may store and update the bucket locations, corresponding user keys, and user to storage provider mapping information in a clustered database 608 in data plane 604. Relevant bucket locations, corresponding user keys, and user to storage provider mapping information from clustered database 608 may be retrieved by an object proxy gateway module 612 integrated in user application 610. Object proxy gateway module 612 may receive instructions from user application 610 to manipulate a stored object associated with user application 610. In response to the instructions, object proxy gateway module 612 may generate a HTTP redirect and pre-signed URL based on the relevant bucket locations, corresponding user keys, and user to storage provider mapping information in clustered database 608. Object proxy gateway module 612 may then execute the generated HTTP redirect and pre-signed URL based on the instructions from user application 610. User application 610 may utilize the generated HTTP redirect and pre-signed URL via object proxy gateway module 612 to directly upload objects to and download objects from a cloud provider 614.

By directly downloading and uploading objects from cloud provider 614, enterprise network performance may be enhanced due to a decrease in network consumption. Likewise, utilizing a HTTP redirect and pre-signed URL may result in faster response times for the user and may streamline application programming interface (API) experience across different cloud providers by minimizing the required access keys and secret keys. Additionally, with gateway module 612 running on user application 610, gateway module 612 may track user telemetry and handle event-based billing.

Accordingly, with this technology, an optimized process for providing a pre-signed proxy redirect to facilitate object storage in user buckets on a plurality of cloud storage providers is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a proxy redirect to facilitate a storage and a retrieval of an object, the method being implemented by at least one processor, the method comprising:

receiving, by the at least one processor, at least one mapping of a user to a logical container that stores the object among a plurality of logical containers and to a storage provider that stores the logical container among a plurality of storage providers;

receiving, by the at least one processor, at least one key corresponding to the logical container mapped to the user and associated with the user;

storing, by the at least one processor, the at least one mapping and the at least one key in a database;

automatically generating, by the at least one processor for the user, at least one application protocol that redirects to a pre-signed web address that is specific to the object stored in the logical container mapped to the user based on the stored at least one mapping and the stored at least one key, the pre-signed web address includes an identification of the object including a resource locator that grants temporary access to the object stored in the logical container mapped to the user, wherein the at least one application protocol is automatically generated by an object proxy gateway in a data plane of an object proxy service;

automatically transmitting, by the at least one processor via a communication interface, the at least one application protocol to the user;

tracking, by the at least one processor via the object proxy gateway, user telemetry; and managing, by the at least one processor via the object proxy gateway, event-based billing according to the user telemetry.

2. The method of claim 1, further comprising:

receiving, by the at least one processor, at least one new mapping for the user that includes a new storage provider and at least one new key;

updating, by the at least one processor, the database with the at least one new mapping and the at least one new key;

automatically generating, by the at least one processor for the user, at least one new application protocol that redirects to a new pre-signed web address based on the at least one new mapping and the at least one new key; and automatically transmitting, by the at least one processor via the communication interface, the at least one new application protocol to the user.

3. The method of claim 1, wherein the pre-signed web address is valid to access the logical container at the storage provider for a predetermined period of time, and the predetermined period of time is based on a schedule, a business policy, and a regulation that relates to a type of information and a quantity of information a financial institution stores on the storage provider.

4. The method of claim 3, wherein the business policy includes a threshold price charged by the storage provider and a threshold level of security compliance of the storage provider.

5. The method of claim 1, wherein the at least one application protocol is generated by a separate microservice in an enterprise network.

6. The method of claim 1, wherein the object includes data, corresponding metadata, and a unique enterprise network identifier.

7. The method of claim 1, wherein the user includes at least one from among a monolithic application and a microservice application in an enterprise network.

8. The method of claim 7, wherein the at least one application protocol is generated by a module that is integrated into the user, the user including a user application.

9. The method of claim 1, wherein the storage provider includes a third-party entity operating remote storage systems over a network.

10. The method of claim 1, wherein the at least one application protocol includes a Hypertext Transfer Protocol (HTTP) and the pre-signed web address includes a Uniform Resource Locator (URL) that grants access to the object identified in the URL.

11. A computing device configured to implement an execution of a method for providing a proxy redirect to facilitate a storage and a retrieval of an object, the computing device comprising:

a processor;

a memory; and a communication interface coupled to each of the processor and the memory, wherein the processor is configured to:

receive at least one mapping of a user to a logical container that stores the object among a plurality of logical containers and to a storage provider that stores the logical container among a plurality of storage providers;

receive at least one key corresponding to the logical container mapped to the user and associated with the user;

store the at least one mapping and the at least one key in a database;

automatically generate, for the user, at least one application protocol that redirects to a pre-signed web address that is specific to the object stored in the logical container mapped to the user based on the stored at least one mapping and the stored at least one key, the pre-signed web address includes an identification of the object including a resource locator that grants temporary access to the object stored in the logical container mapped to the user, wherein the at least one application protocol is automatically generated by an object proxy gateway in a data plane of an object proxy service;

automatically transmit, via a communication interface, the at least one application protocol to the user;

track, via the object proxy gateway, user telemetry; and
manage, via the object proxy gateway, event-based billing according to the user telemetry.

12. The computing device of claim 11, wherein the processor is further configured to:
receive at least one new mapping for the user that includes a new storage provider and at least one new key;
update the database with the at least one new mapping and the at least one new key;
automatically generate, for the user, at least one new application protocol that redirects to a new pre-signed web address based on the at least one new mapping and the at least one new key; and
automatically transmit, via the communication interface, the at least one new application protocol to the user.

13. The computing device of claim 11, wherein the pre-signed web address is valid to access the logical container at the storage provider for a predetermined period of time, and the predetermined period of time is based on a schedule, a business policy, and a regulation that relates to a type of information and a quantity of information a financial institution stores on the storage provider.

14. The computing device of claim 13, wherein the business policy includes a threshold price charged by the storage provider and a threshold level of security compliance of the storage provider.

15. The computing device of claim 11, wherein the processor is further configured to cause a separate microservice in an enterprise network to generate the at least one application protocol.

16. The computing device of claim 11, wherein the object includes data, corresponding metadata, and a unique enterprise network identifier.

17. The computing device of claim 11, wherein the user includes at least one from among a monolithic application and a microservice application in an enterprise network.

18. The computing device of claim 17, wherein the processor is further configured to cause a module that is integrated into the user to generate the at least one application protocol, the user including a user application.

19. The computing device of claim 11, wherein the storage provider includes a third-party entity operating remote storage systems over a network.

20. The computing device of claim 11, wherein the at least one application protocol includes a Hypertext Transfer Protocol (HTTP) and the pre-signed web address includes a Uniform Resource Locator (URL) that grants access to the object identified in the URL.

* * * * *